US010280996B2

(12) United States Patent
Jaeger et al.

(10) Patent No.: US 10,280,996 B2
(45) Date of Patent: May 7, 2019

(54) DISC BRAKE

(71) Applicant: WABCO Europe BVBA, Brussels (BE)

(72) Inventors: Hellmut Jaeger, Ludwigshafen (DE); Marcel Kalmbach, Ilsfeld (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 15/518,776

(22) PCT Filed: Dec. 3, 2015

(86) PCT No.: PCT/EP2015/002437
§ 371 (c)(1),
(2) Date: Apr. 13, 2017

(87) PCT Pub. No.: WO2016/107666
PCT Pub. Date: Jul. 7, 2016

(65) Prior Publication Data
US 2017/0234386 A1  Aug. 17, 2017

(30) Foreign Application Priority Data
Dec. 29, 2014  (DE) .......................... 10 2014 019 619

(51) Int. Cl.
*F16D 65/097* (2006.01)
*F16D 55/2255* (2006.01)
*F16D 55/225* (2006.01)

(52) U.S. Cl.
CPC ....... *F16D 65/0978* (2013.01); *F16D 55/225* (2013.01); *F16D 55/2255* (2013.01)

(58) Field of Classification Search
CPC ............... F16D 55/225; F16D 55/2255; F16D 65/0977; F16D 65/0978; F16D 2055/007; F16D 65/095
(Continued)

(56) References Cited

U.S. PATENT DOCUMENTS 5,538,105 A * 7/1996 Rike ..................... F16D 55/228
188/73.31
7,641,025 B2 * 1/2010 Baumgartner .......... F16D 65/18
188/162
(Continued)

FOREIGN PATENT DOCUMENTS

DE  102006002306 A1  8/2007
DE  102006039298 B3  4/2008
(Continued)

*Primary Examiner* — Thomas W Irvin
(74) *Attorney, Agent, or Firm* — Leydig, Voit & Mayer, Ltd.

(57) ABSTRACT

A disc brake includes a brake caliper, a brake pad, a retaining spring holding the brake pad in a radial direction relative to a brake axis, a retaining bracket pretensioning the retaining spring in the radial direction, a first holder on the brake caliper configured to support the retaining bracket towards a radial outside, and a second holder on the brake caliper configured to support the retaining bracket radially towards the radial outside but not in an axial direction, the second holder comprising a stop. At least one of the first holder or the second holder has a stop acting in a first axial direction. The retaining bracket has at least one of a first protrusion that rests on the retaining spring in a second axial direction opposite the first axial direction and a second protrusion that rests on the brake caliper in the second axial direction.

20 Claims, 5 Drawing Sheets

(58) Field of Classification Search
USPC .................................................. 188/73.31
See application file for complete search history.

(56) References Cited

U.S. PATENT DOCUMENTS

| | | | | |
|---|---|---|---|---|
| 8,215,458 B2* | 7/2012 | Wolf | ................... | F16D 65/0978 |
| | | | | 188/73.36 |
| 8,627,929 B2* | 1/2014 | Baumgartner | ...... | F16D 65/0978 |
| | | | | 188/1.11 E |
| 9,695,894 B2* | 7/2017 | Falter | ...................... | F16D 55/22 |
| 9,765,832 B2* | 9/2017 | Knoop | ................. | F16D 55/226 |
| 9,803,711 B2* | 10/2017 | Sandberg | ............. | F16D 65/567 |
| 9,810,276 B2* | 11/2017 | Roberts | ................ | F16D 55/226 |
| 9,829,056 B2* | 11/2017 | Peschel | ................ | F16D 55/225 |
| 9,863,492 B2* | 1/2018 | Fischl | ................. | F16D 65/0068 |
| 9,933,028 B2* | 4/2018 | Falter | ................. | F16D 65/0978 |
| 2004/0163901 A1* | 8/2004 | Thomas | ................ | F16D 55/226 |
| | | | | 188/73.31 |
| 2004/0168868 A1* | 9/2004 | Thomas | ............. | F16D 65/0977 |
| | | | | 188/73.37 |
| 2005/0067232 A1* | 3/2005 | Roberts | .................. | F16D 55/28 |
| | | | | 188/73.1 |
| 2008/0067016 A1* | 3/2008 | Pritz | ..................... | F16D 55/225 |
| | | | | 188/73.38 |
| 2008/0264739 A1* | 10/2008 | Pritz | .................. | F16D 65/0043 |
| | | | | 188/73.31 |
| 2009/0236188 A1* | 9/2009 | Raffin | ................. | F16D 65/0974 |
| | | | | 188/73.31 |
| 2011/0005872 A1* | 1/2011 | Baumgartner | ...... | F16D 65/0978 |
| | | | | 188/73.31 |
| 2011/0247905 A1* | 10/2011 | Thomas | ................ | F16D 65/183 |
| | | | | 188/73.31 |
| 2015/0184710 A1 | 7/2015 | Peschel et al. | | |
| 2016/0116009 A1 | 4/2016 | Falter et al. | | |
| 2017/0138426 A1* | 5/2017 | Schoenauer | .......... | F16D 55/226 |
| 2017/0241495 A1* | 8/2017 | Henning | ............. | F16D 55/225 |
| 2018/0252280 A1* | 9/2018 | Krause | ................ | F16D 65/0978 |
| 2018/0291973 A1* | 10/2018 | Schoenauer | .......... | F16D 55/226 |

FOREIGN PATENT DOCUMENTS

| | | | | |
|---|---|---|---|---|
| DE | 102007049979 A1 | | 4/2009 | |
| DE | 202008013446 U1 | | 4/2009 | |
| DE | 102012108667 A1 | | 3/2014 | |
| DE | 10-2013-00816 A | * | 11/2014 | ............. F16D 55/22 |
| DE | 102013008155 A1 | | 11/2014 | |
| WO | 03069180 A1 | | 8/2003 | |

* cited by examiner

DISC BRAKE

CROSS REFERENCE TO RELATED APPLICATIONS

This application is a U.S. National Stage Application under 35 U.S.C. § 371 of International Application No. PCT/EP2015/002437 filed on Dec. 3, 2015, and claims benefit to German Patent Application No. DE 10 2014 019 619.4 filed on Dec. 29, 2014. The International Application was published in German on Jul. 7, 2016 as WO 2016/107666 A1 under PCT Article 21(2).

FIELD

The invention concerns a disc brake with a brake caliper, at least one brake pad, a retaining spring holding the brake pad in a radial direction relative to a brake axis, a retaining bracket pretensioning the retaining spring in the radial direction, a first holder on the brake caliper which supports the retaining bracket towards the radial outside, and a second holder with a stop on the brake caliper which supports the retaining bracket radially towards the outside but not in the axial direction, wherein the first or second holder has a stop acting in the first axial direction.

BACKGROUND

Disc brakes of the above type are known, for example from DE 10 2012 108 667 A1. In the known disc brake, the previously normal fixing of the retaining bracket to the wheel side of the brake caliper by means of a bolt screwed into a threaded opening of the caliper, has already been replaced by a locking lug on the wheel side on which the retaining bracket is supported towards the radial outside. On the clamping side, the retaining bracket is received in a slot of the first holder. The rear wall of the slot constitutes a stop acting in a first axial direction because it prevents an axial movement of the retaining bracket from the wheel side in the direction of the clamping side. Locking tabs serve for security in the second axial direction opposite the first axial direction, and are formed either on the retaining spring itself or on an additionally provided cover. The locking tabs are elastically deformable, i.e. in order to fit the retaining bracket, they must be deformed against their elastic return force. This means a corresponding complexity in installation or removal.

The same applies to the brake described in DE 20 2008 013 446. Here again, the retaining bracket is held on one side in a mounting opening of the brake caliper. On the other side, a hook on the brake caliper provides support towards the radial outside. Once again, an elastic element acting as a blocking device in the form of a spring serves as security against axial movements out of the mounting opening, with the same problems for installation or removal.

According to DE 10 2006 002 306 A1, a receiving pocket is provided in a disc brake on the clamping side for holding the retaining bracket towards the radial outside. For security against movements in the axial direction towards the wheel side, a wheel-side stop is provided which also provides security towards the radial outside. For security against an axial movement away from the wheel side, i.e. towards the clamping side, a spring bracket or bracket clip is provided. Alternatively, a locking pin is provided with a spring tab. This solution is also complex with regard to installation and removal.

SUMMARY

In an embodiment, the present invention provides a disc brake. The disc brake includes a brake caliper, a brake pad, a retaining spring holding the brake pad in a radial direction relative to a brake axis, a retaining bracket pretensioning the retaining spring in the radial direction, a first holder on the brake caliper configured to support the retaining bracket towards a radial outside, and a second holder on the brake caliper configured to support the retaining bracket radially towards the radial outside but not in an axial direction, the second holder comprising a stop. At least one of the first holder or the second holder has a stop acting in a first axial direction. The retaining bracket has at least one of a first protrusion that rests on the retaining spring in a second axial direction opposite the first axial direction and a second protrusion that rests on the brake caliper in the second axial direction but not towards the radial outside.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
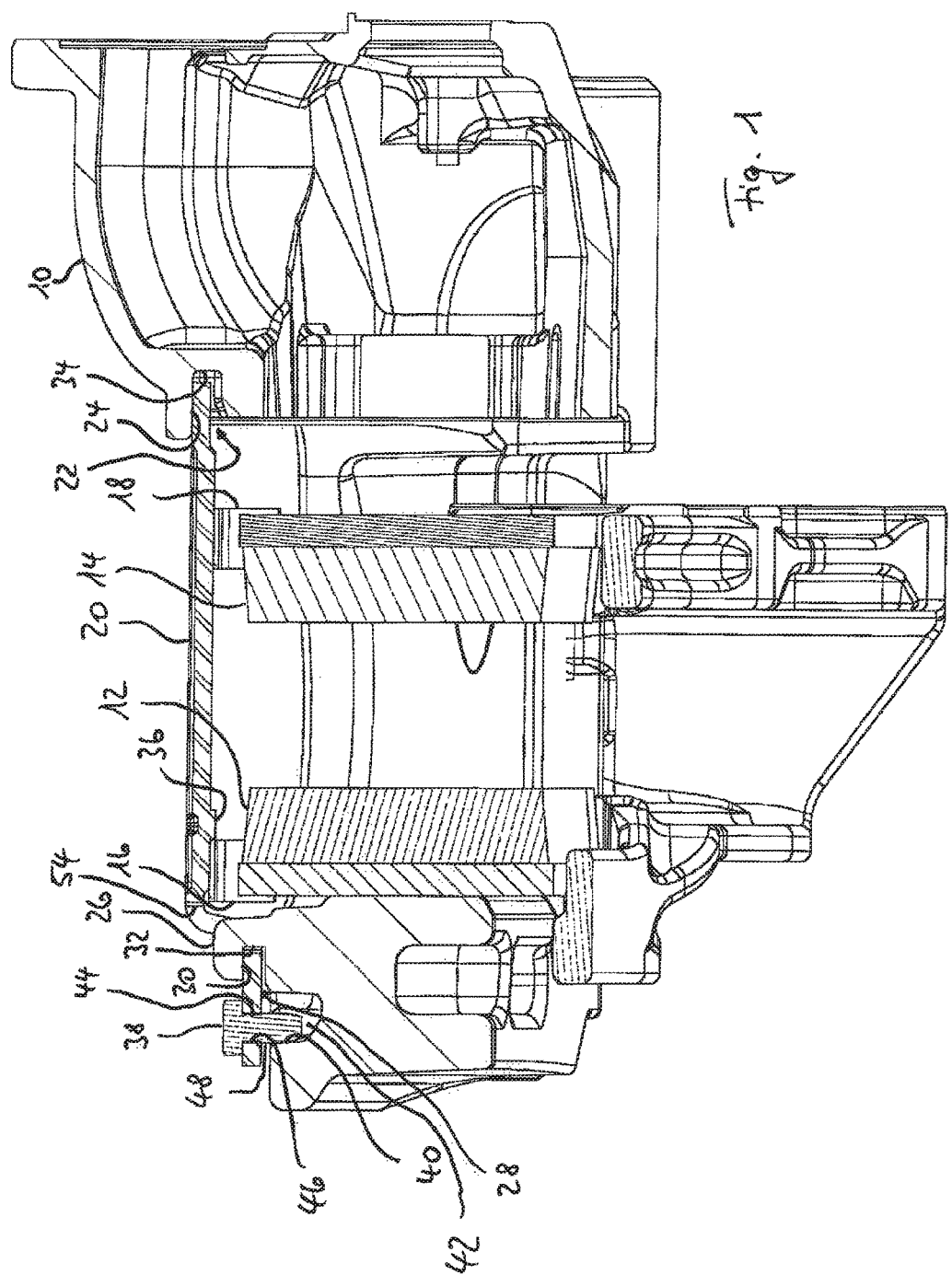
FIG. 1 is a diagrammatic partial section view of a first embodiment of the invention.

A disc brake is described herein having simplified construction and providing for simplified installation relative to, e.g., the brake described in DE 10 2012 108 667 A1.

Embodiments of the invention provide a disc brake, in particular for commercial vehicles, having a brake caliper, at least one brake pad, a retaining spring holding the brake pad in a radial direction relative to a brake axis, a retaining bracket pretensioning the retaining spring in the radial direction, a first holder on the brake caliper which supports the retaining bracket towards the radial outside, and a second holder with a stop on the brake caliper which supports the retaining bracket radially towards the outside but not in the axial direction, wherein the first or second holder has a stop acting in the first axial direction. The retaining bracket has a first protrusion which rests axially on a retaining spring in a second axial direction opposite the first axial direction, and/or has a second protrusion which rests on the brake caliper in the second axial direction but not towards the radial outside.

The retaining bracket mentioned above is a component which must be sufficiently resistant to bending to pretension the retaining spring in the radial direction. The term "radial direction" does not necessarily refer to a direction which stands with mathematical precision radially to the brake axis. Rather, the term "radial direction" refers to a direction in which the brake pad must be pretensioned in order to be held reliably in the brake. The pretension force is here directed from outside to inside. The retaining bracket is usually a sheet-formed part.

The first holder, according to embodiments of the invention, is configured, for example, as known from DE 10 2012 108 667 A1. In other words, for example a slot is provided on the one side for receiving the retaining bracket. Its rear wall may serve as an axial stop. It may however also be a mounting opening or a receiving pocket corresponding to the two other known disc brakes. It is essential only that the first holder provides security towards the radial outside, and that in addition a stop is provided which acts in the first axial direction. This stop, as already explained, may be the rear wall of the slot, the mounting opening or the receiving pocket.

On the other side of the retaining bracket, the second holder is provided. If the first holder lies on the clamping side, the second holder lies on the wheel side. It serves to receive the reaction force of the retaining spring in the radial direction. This means that it secures the retaining bracket against a movement towards the radial outside. In contrast to a bolt known from the prior art which is screwed into the brake caliper, the second holder according to embodiments of the invention does not provide any security against displacement in the axial direction. Depending on configuration, the second holder may however also have a stop in the peripheral direction.

To secure the retaining bracket against displacement in the second axial direction, according to the invention for example a protrusion is provided on the retaining bracket which rests on the retaining spring in the second axial direction. This support firstly prevents the retaining bracket from moving out of the slot, mounting opening or receiving pocket. Secondly, the first protrusion gives the retaining bracket a further function, in addition to pretensioning the retaining spring. Namely it thus prevents an axial movement of the retaining spring and hence the brake pad in the radially outward region, and also counters a tipping play of the brake pad which would otherwise entail the risk of oblique wear. This applies in particular if the first protrusion is assigned to the retaining spring on the wheel side.

In particular with regard to embodiments of the invention with the first protrusion, no special tools are required for installation/removal of the brake pad or the construction elements serving for retention. Rather, only the retaining spring need be pretensioned in order to overcome the height offset or form fit between the retaining spring and retaining bracket.

In addition or alternatively to the first protrusion, a further (second) protrusion may be provided which rests on the brake caliper in the axial direction but not towards the radial outside.

In both solutions according to embodiments of the invention (first and second protrusion), no (additional) spring elements are required which would have to be deformed against their elastic reset force for installation and/or removal. This simplifies installation/removal.

According to embodiments of the invention, preferably the first protrusion is configured integrally with the retaining bracket. Thus for example it is merely a shoulder on the side of the retaining bracket facing the retaining spring. This gives a particularly simple manner of implementing the invention.

Further preferably, a recess is provided on the brake caliper into which the second protrusion protrudes, and against the inner wall of which it rests in the second axial direction. Such a recess may easily be formed on the brake caliper. This is possible for example by corresponding design of the casting mold for a brake caliper produced using a casting process. No further machining work is required, in contrast to conventional brakes in which threaded bores must be made. This considerably reduces the production cost.

Both the first protrusion and also the second protrusion may be a pin. Such embodiments where the first and second protrusions are pins are particularly simple with regard to production.

If the second protrusion is a pin, according to embodiments of the invention it may preferably be provided that this extends from the retaining bracket into the recess on the brake caliper. Again, for this solution there is no need for further machining of a brake caliper which has previously been produced with a suitable casting mold for forming the recess.

According to further preferred embodiments of the invention, the pin may have an outer thread. This outer thread may serve in particular to attach the pin to the retaining bracket by means of a screw connection. The pin may also be a bolt.

The outer thread may be made self-tapping. According to further embodiments of the invention, however, an opening may also be provided on the retaining bracket which has an inner thread matching the outer thread, into which the pin is screwed.

In addition or alternatively, a holder part may be provided with an inner thread matching the outer thread. The holder part may for example be a threaded nut. This threaded nut may have a passage opening provided with an inner thread. It may however also have a blind hole provided with an inner thread. When a holder part is used, the pin provided with the outer thread will rest not directly but only indirectly on the retaining spring or brake caliper. The holding part may be a slot nut.

The holder part may be held non-rotatably. This further simplifies installation (screwing the pin into the holding part).

Finally, according to embodiments of the invention it is further preferably provided that the holder part is received at least partially in the recess. In such embodiments, it may be placed in the recess on installation, which reduces the risk of losing the holder part and hence facilitates installation. Evidently, firstly the recess and secondly the holder part may be matched to each other such that the holder part is no longer rotatable as soon as it is inserted in the recess.

A first exemplary embodiment of the disc brake according to the invention shown in FIG. 1 contains a brake caliper 10, two brake pads 12, 14, two retaining springs 16, 18 and a retaining bracket 20. The retaining bracket 20 pretensions the retaining springs 16 and 18 in the radial direction, i.e. downward in FIG. 1. A brake disc (not shown) lies between the brake pads 12 and 14. The retaining bracket 20 also serves as protection against loss of the brake pads 12 and 14, in particular on breakage of the retaining springs 16, 18. It is held on a clamping side in a slot 22, the wall 24 of which lying on the outside in the radial direction receives the pretension force. On the wheel side, a hump 26 is formed on the brake caliper 10, and also has a slot 28. Once again, the radially outward wall 30 of the slot 28 serves to receive the reaction force of the pretension force.

The retaining bracket 20 is movable in the axial direction in the two slots 22 and 28. If it is moved in a first axial direction, i.e. in the exemplary embodiment shown in FIG. 1, from the wheel side towards the clamping side (from right to left in FIG. 1), then on displacement beyond a predefined dimension, it hits against the rear wall 32 of the slot 28. The geometric conditions may however be selected such that it hits against the rear wall 34 of the slot 22. The decisive factor is in which slot the greatest clearance exists. Preferably, the clearance in slot 22 is greater than that in slot 28, as depicted.

To secure the retaining bracket 20 against displacement in a second axial direction opposite the first axial direction, i.e. from right to left in FIG. 1, firstly a protrusion 36 is provided which hits against the retaining spring 16 in the case of said displacement in the second axial direction. A bolt 38 serves the same purpose, and in said case hits against an inner wall 40 of a recess 42 in the brake caliper 10.

It is expressly pointed out here that according to the embodiment of the invention, both the protrusion 36 and the bolt 38 may be provided, but only one of the two need be provided in order to implement the invention.

The retaining bracket 20 according to the embodiment of FIG. 1 is installed as follows. The retaining bracket 20 is inserted into the slots 22 and 28 from left to right in FIG. 1. Here the retaining springs 16 and 18 are pressed down in the radial direction. Evidently, in this case the bolt 38 must either be removed or unscrewed so far that it does not hit against the caliper 10. Insertion proceeds until the protrusion 36 has travelled over the retaining spring 16 and reached the position shown in FIG. 1. In this state, the bolt 38 is screwed in. For this, the retaining bracket 20 has an opening 44. The opening may first be provided with an inner thread 46 which matches an outer thread 48 of the bolt 38. The configuration may however be such that the outer thread 48 of the bolt 38 is self-tapping, whereby the prior formation of an inner thread on the retaining bracket 20 is not required. After the bolt 38 has been screwed in so that it protrudes into the recess 42, the inner wall 40 of the recess 42 also constitutes a stop against displacement in the second axial direction.

The protrusion 36 has two functions. Firstly, it contributes to holding the retaining bracket 20 in the slots 22 and 28. Secondly, it prevents the retaining spring 16 from moving to the right in FIG. 1. It thus counters a tipping play and hence a resulting oblique wear on the brake pad 12.

Figure 2:
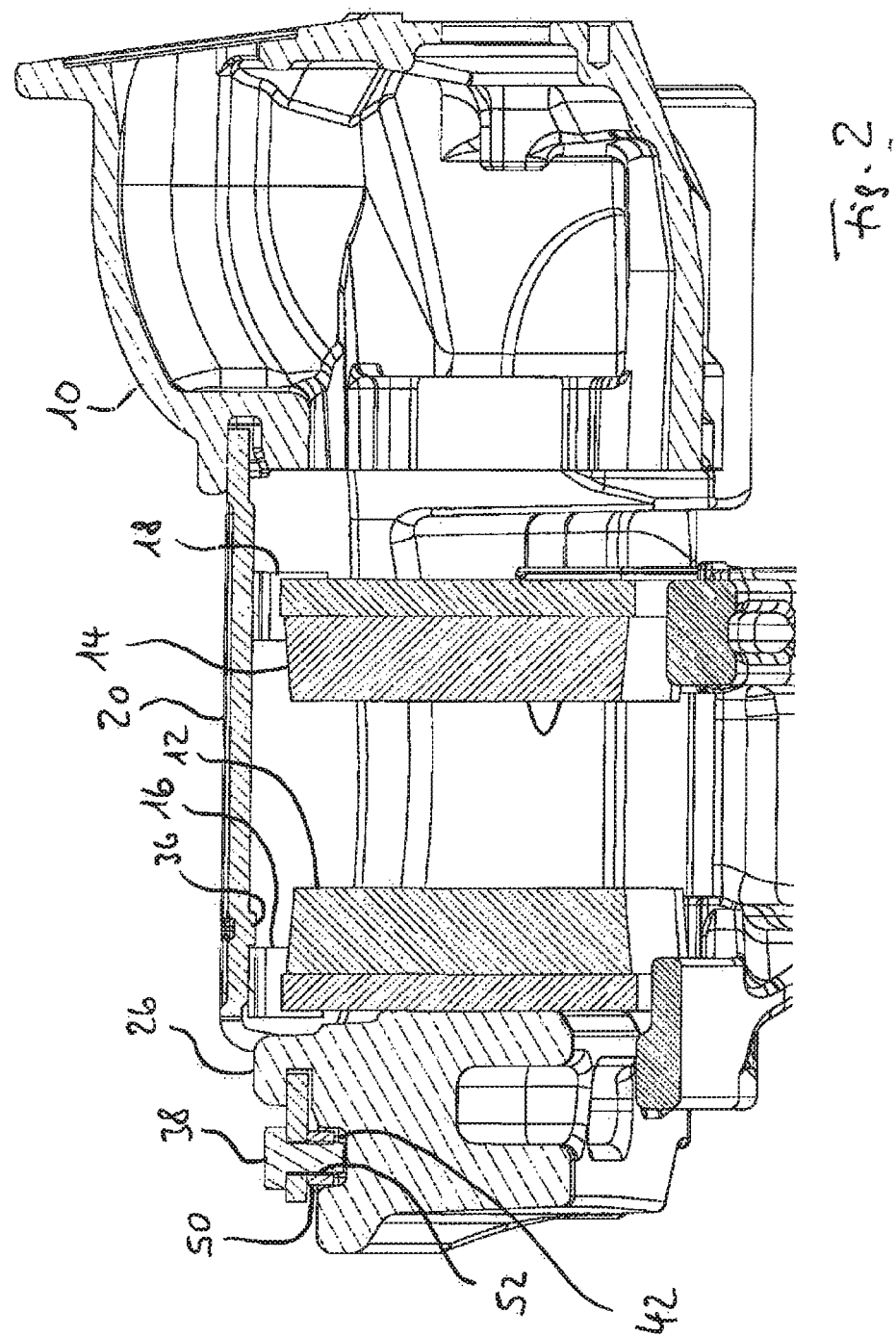
FIG. 2 is a diagrammatic partial section view of a second embodiment of the invention.
Figure 3:
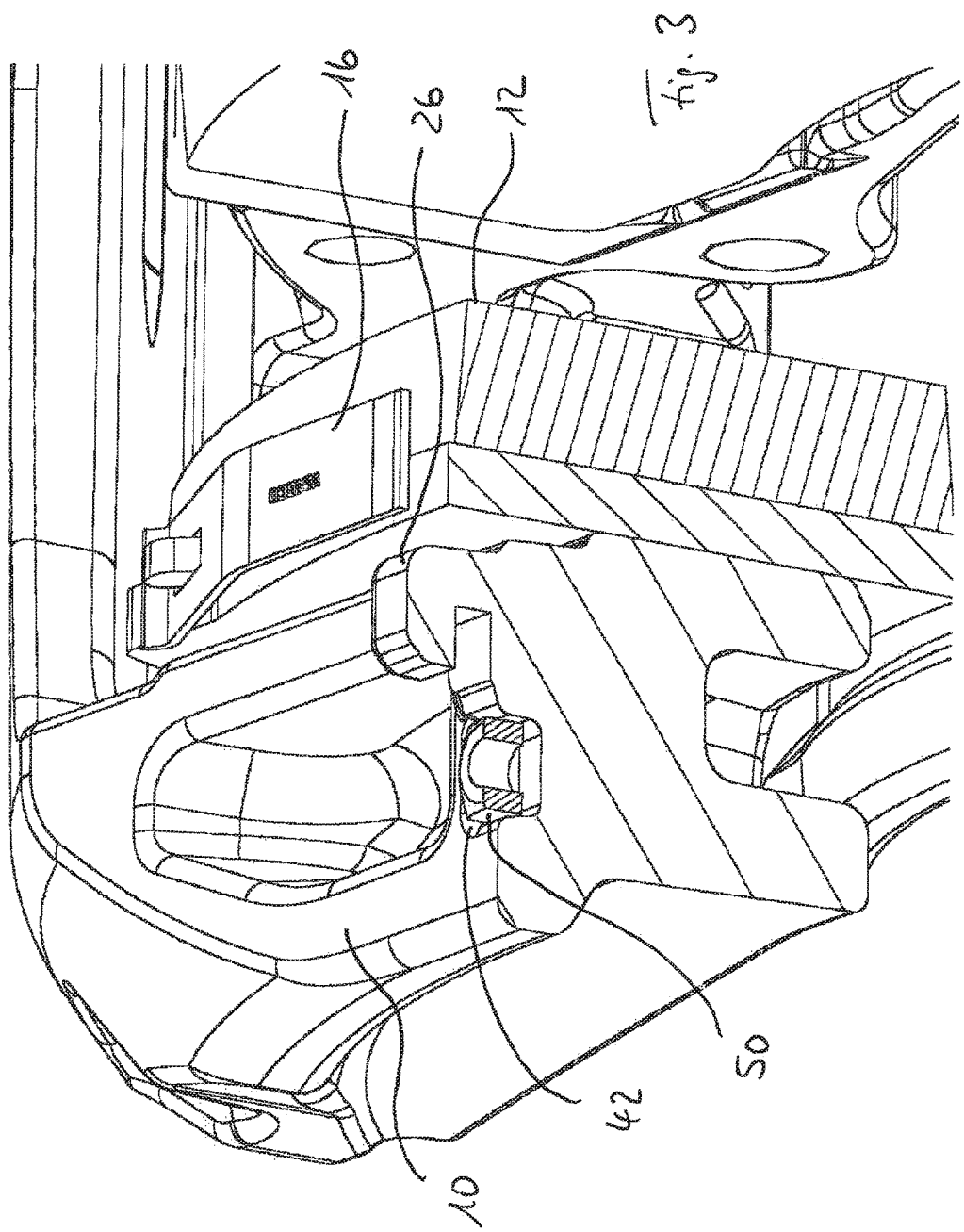
FIG. 3 is a diagrammatic perspective partial section view of the second embodiment of the invention during installation.

The embodiment of FIG. 2 corresponds to the exemplary embodiment of FIG. 1 apart from the configuration and holding of the bolt 38. In the embodiment of FIG. 2, namely a slot nut 50 is provided with an inner thread 52. For installation, in this case firstly the slot nut 50 is placed in the recess 42. It is held non-rotatably therein. Then, as in the first exemplary embodiment, the retaining bracket 20 is inserted from the left into the slots 22 and 28 until the protrusion 36 reaches the position shown. In this state, the bolt 38 is screwed into the slot nut 50.

Figure 4:
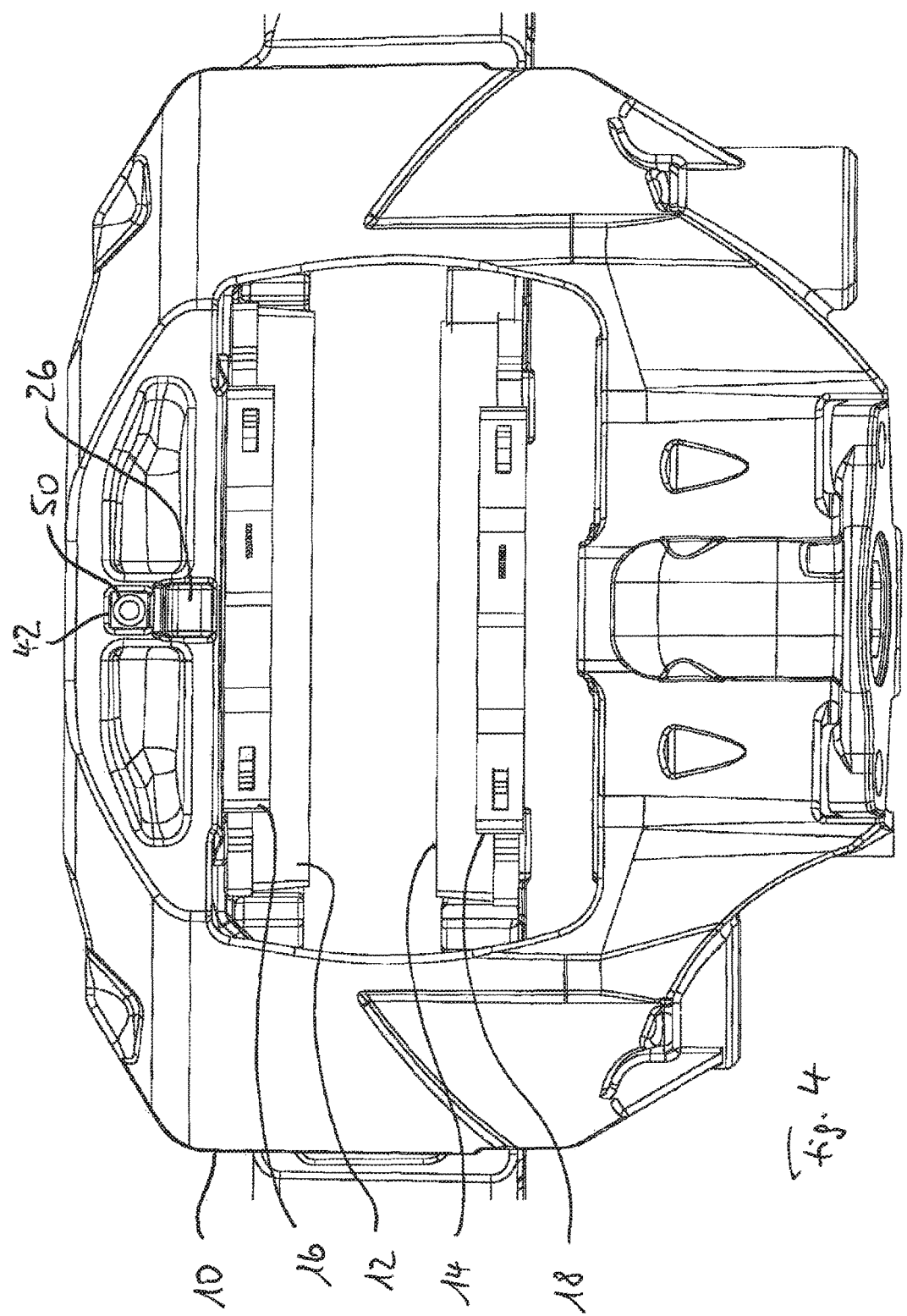
FIG. 4 is a diagrammatic top view of the second embodiment of the invention in the same state as in FIG. 3.

FIG. 4 shows a top view of the slot nut 50 in the recess 42.

Figure 5:
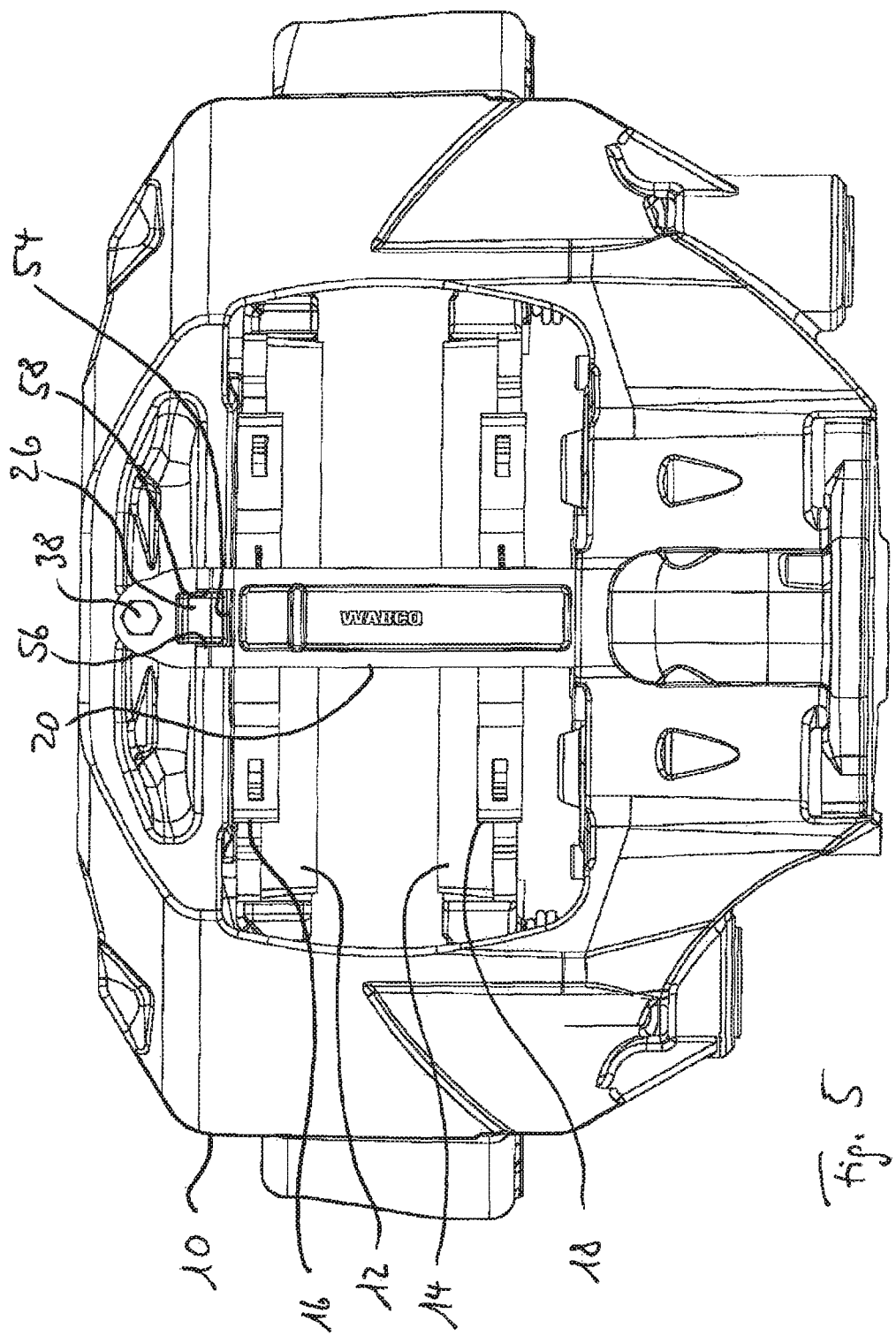
FIG. 5 is a diagrammatic top view of the second embodiment of the invention after installation.

FIG. 5 shows that the hump 26 serving as a second holder, as well as securing the retaining bracket 20 against a radially outward movement, also serves for protection against movements in the peripheral direction because it extends into an opening 54 of the retaining bracket 20, so that its side walls 56 and 58 make contact in the peripheral direction when the retaining bracket moves in the peripheral direction beyond a predefined extent.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Brake caliper
12 Brake pad
14 Brake pad
16 Retaining spring
18 Retaining spring
20 Retaining bracket
22 Slot
24 Wall
26 Hump
28 Slot
30 Wall
32 Rear wall
34 Rear wall
36 Protrusion
38 Bolt
40 Inner wall
42 Recess
44 Opening
46 Inner thread
48 Outer thread
50 Slot nut
52 Inner thread
54 Opening
56 Side wall
58 Side wall

The invention claimed is:

1. A disc brake comprising:
    a brake caliper,
    a brake pad,
    a retaining spring holding the brake pad in a radial direction relative to a brake axis,
    a retaining bracket pretensioning the retaining spring in the radial direction,
    a first holder on the brake caliper at least partially disposed on a radial inside of the retaining bracket and configured to limit displacement of the retaining bracket in a radial inside direction, and
    a second holder on the brake caliper at least partially disposed on a radial inside of the retaining bracket and configured to limit displacement of the retaining bracket in the radial inside direction but not to limit displacement of the retaining bracket in an axial direction, wherein at least one of the first holder or the second holder has a stop configured to limit displacement of the retaining bracket in a first axial direction, wherein the retaining bracket includes:
a first protrusion configured to hit against the retaining spring so as to limit displacement of the retaining bracket in a second axial direction opposite the first axial direction, and/or
a second protrusion configured to hit against the brake caliper so as to limit displacement of the retaining bracket in the second axial direction but not towards the radial outside.

2. The disc brake as claimed in claim 1, wherein the first protrusion is configured integrally with the retaining bracket.

3. The disc brake as claimed in claim 1, wherein the brake caliper includes a recess into which the second protrusion protrudes, wherein the recess includes an inner wall against which the second protrusion is configured to hit so as to limit displacement of the retaining bracket in the second axial direction.

4. The disc brake as claimed in claim 3, wherein at least one of the first protrusion and the second protrusion is a pin.

5. The disc brake as claimed in claim 4, wherein the pin extends from the retaining bracket into the recess.

6. The disc brake as claimed in claim 4, wherein the pin has an outer thread.

7. The disc brake as claimed in claim 6, wherein the retaining bracket has an opening with an inner thread matching the outer thread.

8. The disc brake as claimed in claim 6, further comprising a holder part with an inner thread matching the outer thread.

9. The disc brake as claimed in claim 8, wherein the holder part is held non-rotatably.

10. The disc brake as claimed in claim 8, wherein the holder part is received at least partially in the recess.

11. The disc brake as claimed in claim 1, wherein the first holder includes a wall disposed on a radial inside of the retaining bracket configured to limit displacement of the retaining bracket in the radial inside direction.

12. The disc brake as claimed in claim 1, wherein the second holder includes a wall disposed on a radial inside of the retaining bracket configured to limit displacement of the retaining bracket in the radial inside direction.

13. The disc brake as claimed in claim 1, wherein the first holder is a slot having a first wall disposed on a radial inside of the retaining bracket and a second wall disposed on a radial outside of the retaining bracket, wherein the first holder is configured to limit displacement of the retaining bracket in the radial inside direction via the first wall of the slot.

14. The disc brake as claimed in claim 13, wherein the second wall of the slot is configured to receive a force exerted by the retaining spring on the retaining bracket in the radial direction towards the radial outside.

15. The disc brake as claimed in claim 1, wherein the second holder is a slot having a first wall disposed on a radial inside of the retaining bracket and a second wall disposed on a radial outside of the retaining bracket, wherein the second holder is configured to limit displacement of the retaining bracket in the radial inside direction via the first wall of the slot.

16. The disc brake as claimed in claim 15, wherein the second wall of the slot is configured to receive a force exerted by the retaining spring on the retaining bracket in the radial direction towards the radial outside.

17. The disc brake as claimed in claim 1, wherein the first holder is disposed at a first end of the retaining bracket in the first axial direction from a second end of the retaining bracket, and wherein the second holder is disposed at the second end of the retaining bracket in the second axial direction from the first end of the retaining bracket.

18. The disc brake as claimed in claim 17, wherein the first holder is a first slot having a rear wall disposed in the first axial direction relative to the first end of the retaining bracket, wherein the second holder is a second slot having a rear wall disposed in the first axial direction relative to a portion of the second end of the retaining bracket, wherein the stop is the rear wall of the second slot, and wherein a clearance is provided between the first end of the retaining bracket and the rear wall of the first slot when the rear wall of the second slot contacts the portion of the second end of the retaining bracket so as to limit displacement of the retaining bracket in the first axial direction.

19. A disc brake comprising:
a brake caliper;
a brake pad;
a retaining spring holding the brake pad in a radial direction relative to a brake axis;
a retaining bracket pretensioning the retaining spring in the radial direction;
a first slot having a first wall disposed on a radial inside of the retaining bracket, the first wall being configured to limit displacement of the retaining bracket in a radial inside direction;
a second slot having a second wall disposed on a radial inside of the retaining bracket, the second wall being configured to limit motion of the retaining bracket in a radial inside direction,
wherein at least one of the first slot or the second slot has a stop configured to limit displacement of the retaining bracket in a first axial direction, and
wherein the retaining bracket includes:
a first protrusion configured to hit against the retaining spring so as to limit displacement of the retaining bracket in a second axial direction opposite the first axial direction, and/or
a second protrusion configured to hit against the brake caliper so as to limit displacement of the retaining bracket in the second axial direction but not towards the radial outside.

20. The disc brake as claimed in claim 19, the first slot further having a third wall disposed on a radial outside of the retaining bracket and the second slot further having a fourth wall disposed on a radial outside of the retaining bracket, wherein the third wall is configured to receive a force exerted by the retaining spring on the retaining bracket in the radial direction towards the radial outside, and
wherein the fourth wall is configured to receive a force exerted by the retaining spring on the retaining bracket in the radial direction towards the radial outside.

* * * * *